(12) United States Patent
Brack et al.

(10) Patent No.: US 7,863,404 B2
(45) Date of Patent: Jan. 4, 2011

(54) METHOD OF MAKING ISOSORBIDE POLYCARBONATE

(75) Inventors: Hans-Peter Brack, Herrliberg (CH); Marianne Guyader, Six-Fours-les-Plages (FR); Han Vermeulen, Hoeven (NL); Dennis James Patrick Maria Willemse, Standdaarbuiten (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 278 days.

(21) Appl. No.: 12/238,683

(22) Filed: Sep. 26, 2008

(65) Prior Publication Data

US 2010/0081784 A1 Apr. 1, 2010

(51) Int. Cl.
*C08G 63/02* (2006.01)
*C08G 64/00* (2006.01)

(52) U.S. Cl. .................. 528/271; 524/502; 524/599; 525/410; 528/196; 528/198; 528/272

(58) Field of Classification Search ................ 524/502, 524/599; 525/410; 528/196, 198, 271, 272
See application file for complete search history.

(56) References Cited

U.S. PATENT DOCUMENTS

| 5,340,916 | A | 8/1994 | Henn et al. |
|---|---|---|---|
| 6,063,464 | A | 5/2000 | Charbonneau et al. |
| 2005/0143554 | A1 | 6/2005 | Dhara et al. |
| 2008/0004417 | A1 | 1/2008 | Jansen et al. |
| 2008/0004418 | A1 | 1/2008 | Jansen et al. |
| 2008/0020961 | A1 | 1/2008 | Rodrigues et al. |
| 2009/0088540 | A1 | 4/2009 | Brack et al. |
| 2009/0088549 | A1 | 4/2009 | Brack et al. |

FOREIGN PATENT DOCUMENTS

| EP | 2033981 A1 | 3/2009 |
|---|---|---|
| GB | 350992 | 6/1931 |
| JP | 58179247 | 10/1983 |
| WO | 2007148604 A1 | 12/2007 |
| WO | 2009052463 A1 | 4/2009 |

*Primary Examiner*—Terressa M Boykin
(74) *Attorney, Agent, or Firm*—Larson & Anderson, LLC

(57) ABSTRACT

A polycarbonate is provided that contains repeat units derived from isosorbide and a residue derived from an activated diaryl carbonate. The polycarbonate has $^1$H-NMR peaks associated with the repeat units derived from isosorbide. The polycarbonate contains no more than a maximum allowable amount of sorbitol-derived color bodies. If these color bodies are present in the polycarbonate it has a $^1$H-NMR peak associated with the color bodies. The maximum allowable amount of color bodies are present when the integrated area of the $^1$H-NMR peak associated with the color bodies divided by the integrated areas of the $^1$H-NMR peaks associated with the repeat units derived from isosorbide is 0.025.

22 Claims, 10 Drawing Sheets

Schematic of the plug flow reactor/flash devolatilization/reactive extruder hybrid system in Example 3

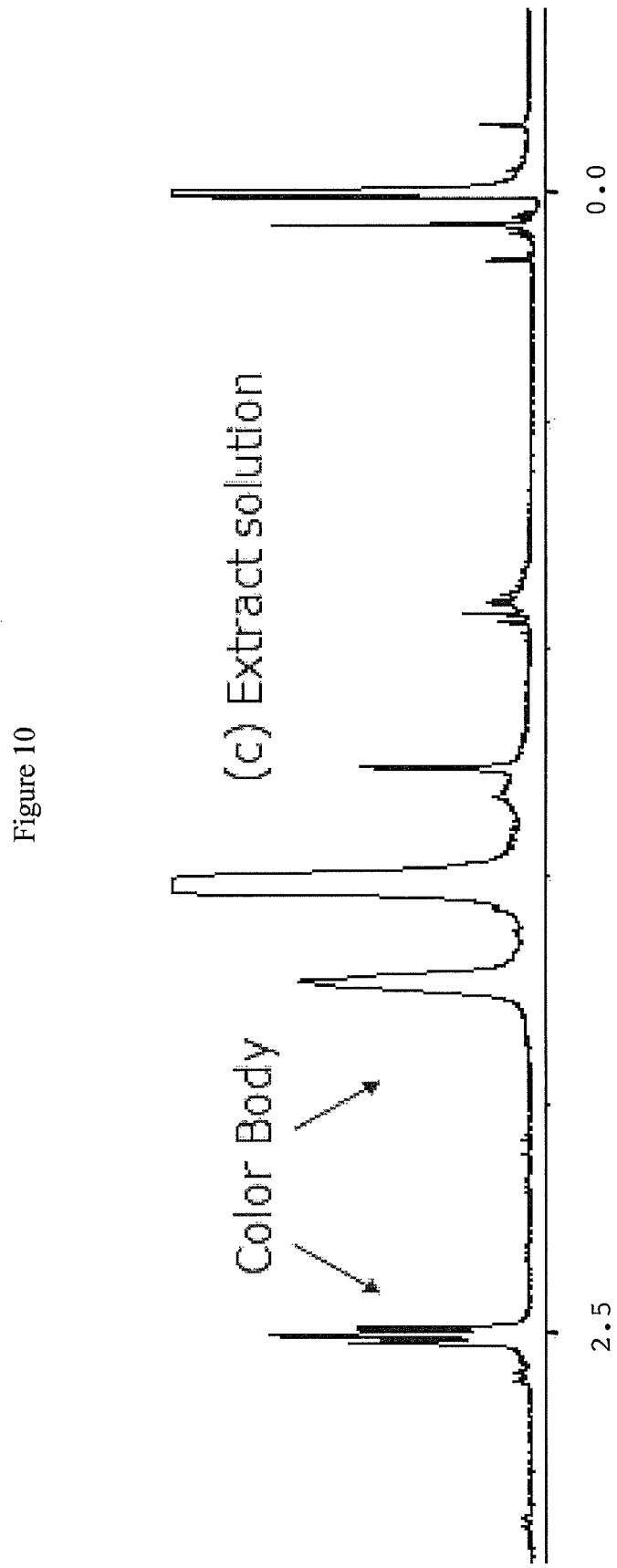

METHOD OF MAKING ISOSORBIDE POLYCARBONATE

BACKGROUND

There is a significant interest in preparing polymers from materials derived from biomass. The diol 1,4:3,6-dianhydro-D-sorbitol, hereinafter referred to as isosorbide, is readily made from renewable resources, such as from sugars and starches. According to the following reaction scheme, isosorbide can be made from biomass derived starch through hydrolysis, hydrogenation, and dehydration reactions.

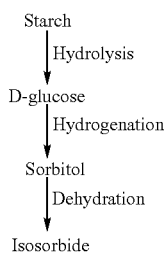

The use of isosorbide in polymerization reactions has been found to result in poorer quality polycarbonate as compared to polycarbonate made from other monomer components and specifically those containing bisphenol-type compounds. These properties include poorer color quality of the polymer as well as reduced mechanical properties such as melt viscosity. There is a need to improve the properties of polymers produced using isosorbide as a monomer component.

SUMMARY OF THE INVENTION

The present Inventors found that polycarbonate produced using isosorbide obtained from different suppliers resulted in product polycarbonates having varying color properties, even though the same or similar reaction conditions were employed. Studies were conducted to determine what was causing the color variations between the polymers and it was determined that the intermediate reaction material, sorbitol, used in the formation of isosorbide has an adverse effect on the color properties of product polymer. The present Inventors also found that the isosorbide coming from the different suppliers had varying amounts of sorbitol present in the isosorbide that led to the formation of color bodies within the produced polycarbonate. Without being bound by a particular mechanism, the present Inventors believe that sorbitol reacts to form color bodies under elevated polymerization reaction temperatures and long reaction times.

The present invention provides at least two methods that may be used together or separately for solving the presently recognized problem. First, if present, the sorbitol is preferably removed from the isosorbide prior to polymerization to form polycarbonate. Second, the product polycarbonate may be treated to reduce the amount of the sorbitol-derived color body after polymerization. By using the methods of the present invention, the Inventors have found that a product isosorbide-containing polycarbonate may be prepared that has superior properties, including superior color, as compared to isosorbide-containing polymers of the past.

In one embodiment, the present invention provides a method of producing an isosorbide-containing polycarbonate. The method comprises the steps of:

(i) providing a first monomer component comprising isosorbide, (ii) performing a monomer component conditioning step selected from the group consisting of: (a) testing the first monomer component for the presence of sorbitol, and if sorbitol is present, treating the first monomer component to reduce the level of sorbitol to an amount less than 0.10 mole % in the first monomer component, and (b) treating the first monomer component to reduce the level of sorbitol to an amount less than 0.10 mole % in the first monomer component, (iii) forming a reaction mixture by adding a diaryl carbonate and a catalyst to the first monomer component, and (iv) allowing the reaction mixture to react under polymerization conditions to build molecular weight, thereby producing an isosorbide-containing polycarbonate.

In another embodiment the present invention provides a further method of producing an isosorbide-containing polycarbonate. The method comprises the steps of:

(i) preparing a polycarbonate by reacting isosorbide with a diaryl carbonate in the presence of a polymerization catalyst under polymerization conditions, and (ii) performing a polycarbonate treatment step selected from the group consisting of: (a) testing the polycarbonate prepared in step (i) for the presence of a sorbitol-derived color body associated with a $^1$H-NMR peak located at a chemical of about 2.55 ppm in a $^1$H-NMR spectrum, and if the sorbitol-derived color body is present, treating the polycarbonate prepared in step (i) to reduce the level of the sorbitol-derived color body, and (b) treating the polycarbonate prepared in step (i) to reduce the level of the sorbitol-derived color body, thereby producing an isosorbide-containing polycarbonate product.

By using the methods of the present invention one is able to prepare an isosorbide-containing polycarbonate having superior properties to those of the prior art. In a further embodiment, the present invention provides a polycarbonate comprising repeat units derived from isosorbide and a residue derived from an activated diaryl carbonate. The polycarbonate has $^1$H-NMR peaks associated with the repeat units derived from isosorbide. The polycarbonate contains no more than a maximum allowable amount of sorbitol-derived color bodies, wherein if sorbitol-derived color bodies are present in the polycarbonate, the polycarbonate has a $^1$H-NMR peak associated with the sorbitol-derived color bodies. The maximum allowable amount of sorbitol-derived color bodies are present when the integrated area of the $^1$H-NMR peak associated with the sorbitol-derived color bodies divided by the combined integrated areas of the $^1$H-NMR peaks associated with the repeat units derived from isosorbide is 0.025.

BRIEF DESCRIPTION OF DRAWING

FIGS. 5 and 8-10 are $^1$H-NMR analysis spectras.

DETAILED DESCRIPTION

Figure 1:
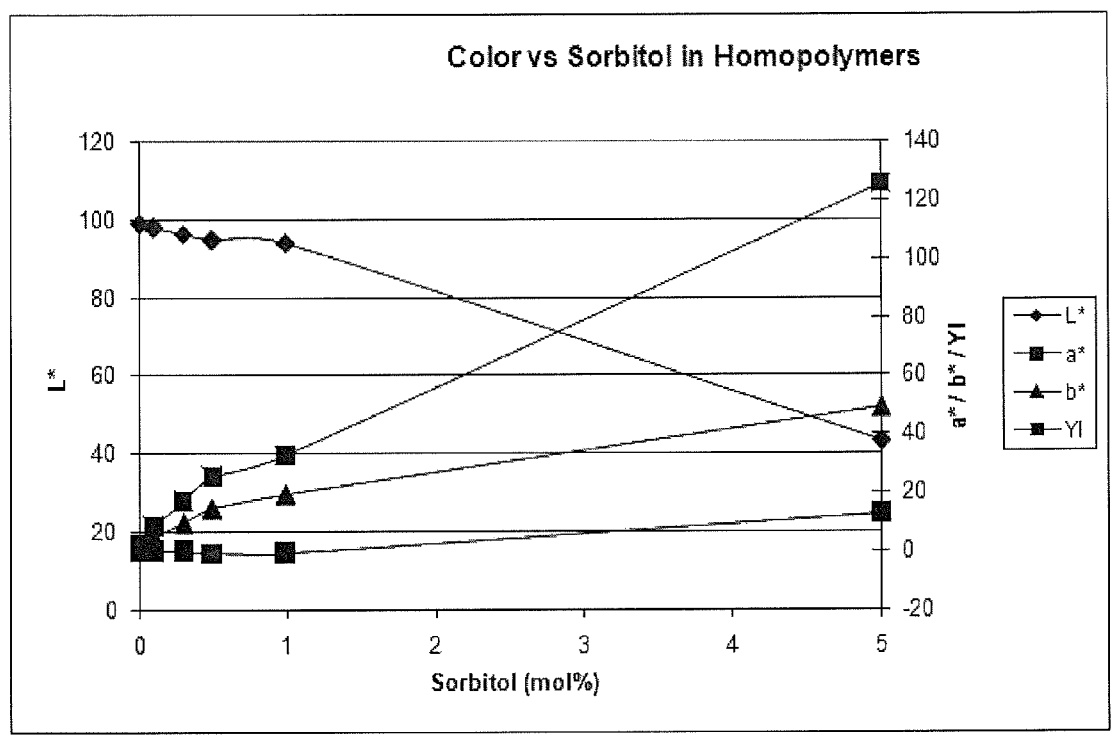
FIGS. 1,2, 4, and 6A-7 are graphical representations of results obtained in the example section.

The present invention may be understood more readily by reference to the following detailed description of preferred embodiments of the invention and the examples included herein. The present invention relates to isosorbide-containing polycarbonate produced by polymerization reactions and to methods of forming polycarbonate from isosorbide.

The present Inventors found that polycarbonate produced using isosorbide obtained from different suppliers resulted in product polycarbonates having varying color properties, even though the same or similar reaction conditions were employed. Studies were conducted to determine what was causing the color variations between the polymers and it was determined that the intermediate reaction material, sorbitol, used in the formation of isosorbide has an adverse effect on the color properties of product polymer. The present Inventors also found that the isosorbide coming from the different suppliers had varying amounts of sorbitol present in the isosorbide that led to the formation of color bodies within the produced polycarbonate. Without being bound by a particular mechanism, the present Inventors believe that sorbitol reacts to form color bodies under elevated polymerization reaction temperatures and long reaction times. Therefore, in order to produce polycarbonate having superior color properties the Inventors have found that the sorbitol concentration in the reaction mixture should be reduced prior to treating at elevated polymerization temperatures and/or the sorbitol-derived color body concentration in the product polycarbonate should be reduced after polymerization.

The Inventors have identified that the sorbitol-derived color bodies have a detectable presence in isosorbide-containing polycarbonate that relates to the color properties of the polymer and to the presence and concentration of sorbitol in the isosorbide monomer raw material. The present invention provides several methods of reducing the sorbitol-derived color bodies in the isosorbide-containing polycarbonate as well as provides an isosorbide-containing polycarbonate having a maximum allowable sorbitol-derived color body content specification that provides good polycarbonate color properties.

In a first embodiment, the present invention provides a method of producing polycarbonate where the monomer component is tested for the presence sorbitol and if present the monomer component is treated to reduce the presence of sorbitol, or alternatively the monomer component is treated to reduce sorbitol concentration regardless of whether it is present or not. In a second embodiment, the polycarbonate product is tested for the presence of the sorbitol-derived color body, and if it is present the polycarbonate product is treated to reduce the presence of the sorbitol-derived color body. In the alternative, the product polycarbonate is treated to reduce the presence of the sorbitol-derived color body regardless of whether it is present or not. In another embodiment a combination of the first and second embodiments may be employed to produce superior polycarbonate.

By using the methods of the present invention, the Inventors have found that the isosorbide-containing product polycarbonate has superior properties including improved color as compared to polycarbonate prepared in the past that contains repeat units derived from isosorbide. The polycarbonate contains residues derived from an activated diaryl carbonate and no more than a maximum allowable level of the sorbitol-derived color bodies.

Definitions

As used in the specification and claims of this application, the following definitions, should be applied.

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one monomer compound (e.g. a dihydroxy compound) joined by carbonate linkages. In certain embodiments of the invention, the polycarbonate comprises residues of an aromatic dihydroxy compound and has a number average molecular weight, Mn, measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one monomer residue unless the context is expressly limiting. Thus, the application encompasses copolycarbonates with residues of 2, 3, 4, or more types of monomer compounds.

The term "sorbitol-derived" as it is used herein to describe an undesirable color body of isosorbide-containing polycarbonate is herein understood to mean that the Inventors believe that the color body is derived from sorbitol. One basis, inter alia, for this belief, as demonstrated in the example section, comes from the link between the color of isosorbide-containing polycarbonate and the amount of sorbitol contained in the reaction mixture formulation used to prepared the polycarbonate. Another basis, inter alia, for this belief, also as demonstrated in the example section, comes from the link between the integrated area of peaks in $^1$H-NMR spectra and the amount of sorbitol contained in the reaction mixture formulation used to prepared the polycarbonate and the color of the polycarbonate.

The phrase "the polycarbonate has $^1$H-NMR peaks associated with the repeat units derived from isosorbide" and similar phrases are herein understood to mean that the a $^1$H-NMR spectra of isosorbide-containing polycarbonate using deuterated chloroform as a solvent has peaks located at chemical shifts at about 4.50 ppm, about 4.56 ppm, and about 4.87 ppm with reference to tetramethylsilane (TMS) that are associated with the incorporated isosorbide monomer.

The phrase "the polycarbonate has a $^1$H-NMR peak associated with the sorbitol-derived color bodies" and similar phrases are herein understood to mean that if sorbitol-derived color bodies are present in the polycarbonate a $^1$H-NMR spectra of the isosorbide-containing polycarbonate using deuterated chloroform as a solvent has a peak located at a chemical shift of about 2.55 with reference to TMS that is associated with the sorbitol-derived color bodies.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

Sorbitol and Isosorbide:

The methods of the present invention include the use of isosorbide as a monomer component in the preparation of polycarbonate. Furthermore, the polycarbonate of the present invention comprises repeat units derived from isosorbide. According to the following reaction scheme, isosorbide can be made from a biomass derived starch through hydrolysis, hydrogenation, and dehydration reactions.

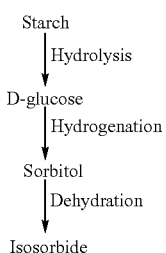

Sorbitol has the following structure:

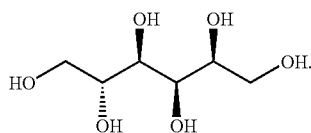

Isosorbide has the following structure:

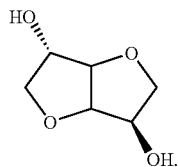

It has been found that isosorbide provided by commercial suppliers contains sorbitol which is likely present due to the incomplete conversion to isosorbide. As described herein, it is believed that sorbitol reacts to form sorbitol-derived color bodies at elevated temperatures and extended reaction times leading to poor color properties of the resulting isosorbide-containing polycarbonate. In one embodiment, the isosorbide monomer is tested for the presence of sorbitol and treated to reduce the concentration of sorbitol prior to polymerization. In another embodiment, the isosorbide is simply treated to reduce the concentration of sorbitol regardless of whether it is present or not. Where isosorbide is tested for the presence of sorbitol, the sorbitol content in isosorbide can be measured by an organic purity measurement method such as chromatographic methods including Gas Chromatography (GC) and High Performance Liquid Chromatography (HPLC). A calibration curve may be generated in these chromatographic methods by analyzing prepared standard solutions having various concentrations of high purity reagent or analytical grade sorbitol. In a preferred embodiment sorbitol content is determined by HPLC.

Optional Additional Monomer Compounds:

The methods of the present invention include the use of isosorbide as a monomer component in the preparation of polycarbonate. In some embodiments another monomer compound (e.g. a second monomer compound) or compounds are optionally selected for incorporation into the product polycarbonate. Therefore, the polycarbonates of the present invention may be isosorbide homopolymers, copolymers, terpolymers, or polymers containing several other monomer compounds.

The additional monomer compounds are not limited to dihydroxy compounds or to aromatic dihydroxy compounds. For example, preferred additional monomer compounds include compounds having one or more functional groups capable of reacting with a dihydroxy compound or a diaryl carbonate to give a chemical bond. Some non-limiting examples of such reactive functional groups are carboxylic acid, ester, amine functional groups and their combinations. Typical monomer compounds will have two functional groups capable of reacting with a dihydroxy compound or a diaryl carbonate; however monofunctional compounds may be used as chainstoppers or endcappers, and trifunctional or higher functional compounds may be used as branching agents. However, dihydroxy and aromatic dihydroxy compounds are frequently preferred for use in these types of applications. Suitable dihydroxy compounds and dihydroxy aromatic compounds are those as described in U.S. patent application Ser. No. 11/863,659 which is incorporated herein by reference for all purposes.

In one embodiment the additional monomer component comprises a compound selected from the group consisting of: ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, 1,2,6-Hexanetriol, resorcinol, Pluronic® PE 3500, Pluronic® PE 6100, and UNITHOX® 480 ETHOXYLATE.

In another embodiment the additional monomer component comprises a compound selected from the group consisting of: bisphenol-A (BPA), $C_{36}$ branched fatty diol, $C_{36}$ diacid, dodecanedioic acid, and sebacic acid. In yet a further preferred embodiment, the additional monomer component comprises BPA and $C_{36}$ diacid.

The Diaryl Carbonate:

As described herein the methods of the present invention relate to polymerization of monomer components comprising sorbitol and those that create carbonate linkages within the polymer. The type and conditions of the polymerization reactions are not particularly limited. However, in a preferred embodiment as described above, polycarbonate is prepared in a melt polymerization reaction using a diaryl carbonate as explained below.

In the production of polycarbonate, the compounds which react with the monomer compounds to form carbonate linkages (e.g. the carbonate source) may be carbonate diesters, carbonyl halides, etc. Specific examples of diaryl carbonates include: diphenyl carbonate, ditolyl carbonate, bis(chlorophenyl)carbonate, m-cresyl carbonate, and dinaphthyl carbonate. Of the various compounds of this type diphenyl carbonate (DPC) is often preferred.

The diaryl carbonate can also be derived from an activated diaryl carbonate or a mixture of an activated diaryl carbonate with a non-activated diaryl carbonate. A preferred activated carbonate of the present invention is an ester-substituted diaryl carbonate such as bismethylsalicylcarbonate (BMSC).

However, as used herein the term "activated diaryl carbonate" is defined as a diaryl carbonate which is more reactive than diphenyl carbonate toward transesterification reactions. Such activated diaryl carbonates are of the general formula:

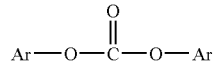

wherein Ar is a substituted aromatic radical having 6 to 30 carbon atoms. The preferred activated diaryl carbonates have the more specific general formula:

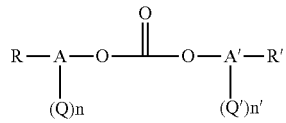

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

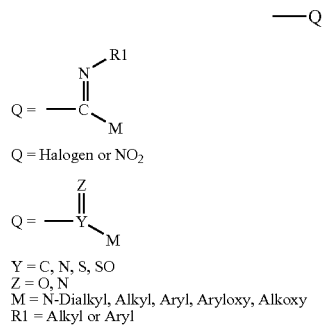

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bismethylsalicylcarbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl)carbonate. Unsymmetrical combinations of these structures, where the substitution number and type on A and A' are different, are also possible to employ in the current invention. A preferred structure for an activated carbonate is an ester-substituted diaryl carbonate having the structure:

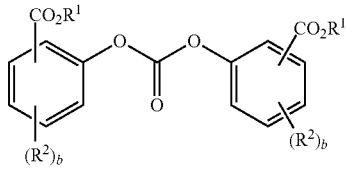

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, Cl-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from 0 to 4. At least one of the substituents $CO_2R^1$ is preferably attached in an ortho position relative to the carbonate group.

Examples of preferred ester-substituted diaryl carbonates include and are not limited to bismethylsalicylcarbonate (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically bismethylsalicylcarbonate is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, it possesses a low volatility, and it possesses a similar reactivity to bisphenol-A. The model transesterification reaction was carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. A preferred reaction temperature is 200° C., but the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity and equilibrium constants compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenyl carbonate.

The theoretical stoichiometry of the reaction within the melt polymerization reaction mixture requires a molar ratio of monomer composition to diaryl carbonate composition of 1:1. However, in practicing the present invention the molar ratio in the melt reaction mixture is suitably between 0.25:1 to 3:1, for example equal to or between 0.9 to 1.1, more preferably between 1:0.95 to 1:1.05 and more preferably between 1:0.98 to 1:1.02.

The Activated Carbonate Residue:

In a preferred embodiment as described herein, polycarbonate is prepared in a melt polymerization reaction using an activated diaryl carbonate. In this embodiment the melt reaction components comprise the monomer component comprising isosorbide, an activated diaryl carbonate, and a melt transesterification catalyst. As the reaction proceeds to form polycarbonate an activated diaryl carbonate residue is produced and is removed from the reaction products to drive the melt transesterification reaction forward and to build molecular weight of the product polycarbonate. The identity of the activated diaryl carbonate residue will depend upon the activated diaryl carbonate used in the process. Polycarbonates produced using an activated diaryl carbonate will contain residual amounts of the activated diaryl carbonate residue.

If an activated diaryl carbonate (e.g. ester-substituted diaryl carbonate) such as bismethylsalicylcarbonate (BMSC) is employed, a typical activated carbonate residue will be a phenolic compound such as an ester-substituted phenol (e.g. methyl salicylate). Similarly if an ester-substituted diaryl carbonate such as bisethylsalicylcarbonate is employed, a typical phenolic by-product will be an ester-substituted phenol such as ethyl salicylate.

In certain preferred embodiments of the present invention the activated carbonate residue is at least one ester-substituted phenol having the structure,

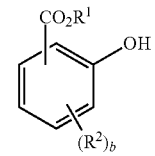

wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4.

Examples of ester-substituted phenols (i.e. activated carbonate residues) include methyl salicylate, ethyl salicylate, propyl salicylate, butyl salicylate, 4-chloro methyl salicylate, benzyl salicylate and mixtures thereof. Typically, methyl salicylate is preferred. Further the solvent may be recovered and reused. For example, ester-substituted phenols such as methyl salicylate may be recovered, purified, and reacted with phosgene to make ester-substituted diaryl carbonates which in turn can be used to prepare oligomeric polycarbonates. Typically, purification of the recovered ester-substituted phenol is efficiently carried out by distillation.

The Catalyst:

As described herein the methods of the present invention relate to polymerization of monomer components comprising sorbitol and those that create carbonate linkages within the polymer. The type and conditions of the polymerization reaction are not particularly limited. However, in a preferred embodiment as described above, polycarbonate is prepared in a melt polymerization reaction using an activated diaryl carbonate. A typical melt transesterfication catalyst system used in accordance with the preferred method of the present invention is an alpha or an alpha/beta catalyst system comprising a base, and preferably comprising at least one source of alkaline earth ions or alkali metal ions, and/or at least one quaternary ammonium compound, a quaternary phosphonium compound or a mixture thereof. The alpha source of alkaline earth ions or alkali metal ions being used is in an amount such that the amount of alkaline earth or alkali metal ions present in the reaction mixture is in a range between $10^{-5}$ and $10^{-8}$ moles alkaline earth or alkali metal ion per mole of dihydroxy compound employed.

If employed, the beta catalyst is a quaternary phosphonium and/or a quaternary ammonium compound. The quaternary ammonium is selected from the group of organic ammonium compounds having structure,

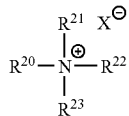

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

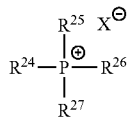

wherein $R^{24}$-$R^{27}$ are independently a $C_1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that X represents $\frac{1}{2}(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

The amount of catalyst employed is typically based upon the total number of moles of dihydroxy compound employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1 \times 10^{-2}$ and $1 \times 10^{-5}$, preferably between $1 \times 10^{-3}$ and $1 \times 10^{-4}$ moles per mole of the first and second dihydroxy compounds combined. The inorganic metal hydroxide catalyst typically will be used in an amount corresponding to between $1 \times 10^{-4}$ and $1 \times 10^{-8}$, preferably $1 \times 10^{-4}$ and $1 \times 10^{-7}$ moles of metal hydroxide per mole of the first and second dihydroxy compounds combined.

In a most preferred catalyst system of the present invention, solely an alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

The Methods of the Present Invention:

The present invention provides various methods for solving the presently recognized problem of sorbitol content in isosorbide used as a monomer in the preparation of polycarbonate. In a first embodiment, the concentration of sorbitol is preferably reduced in the isosorbide component prior to polymerization to form polycarbonate. In a second embodiment, the product polycarbonate may be treated to reduce the amount of the sorbitol-derived color body after polymerization. By using the methods of the present invention, the Inventors have found that a product isosorbide-containing polycarbonate may be prepared that has superior properties, including superior color, as compared to isosorbide-containing polymers of the past.

In the first embodiment, the method comprises the steps of:

(i) providing a first monomer component comprising isosorbide, (ii) performing a monomer component conditioning step selected from the group consisting of: (a) testing the first monomer component for the presence of sorbitol, and if sorbitol is present, treating the first monomer component to reduce the level of sorbitol to an amount less than 0.10 mole % in the first monomer component, and (b) treating the first monomer component to reduce the level of sorbitol to an amount less than 0.10 mole % in the first monomer component, (iii) forming a reaction mixture by adding a diaryl carbonate and a catalyst to the first monomer component, and (iv) allowing the reaction mixture to react under polymerization conditions to build molecular weight, thereby producing an isosorbide-containing polycarbonate.

Sorbitol is believed to be present in isosorbide compounds coming from suppliers of the raw material. It is believed that when sorbitol is present in the isosorbide raw material it reacts to form the sorbitol-derived color body under polymerization conditions involving elevated heat and residence times. The present Inventors have found it desirable to prepare and use isosorbide monomer components comprising less than 0.1 mol % sorbitol, for example less than 0.08 mol % sorbitol, and most preferably less than 0.05 mol % sorbitol. In more preferred embodiments, the present Inventors have found that isosorbide monomer components comprising less than 0.04 mol % (e.g. less than 0.03 mol % or less than 0.01 mol %) sorbitol, are best for use in the present invention. In the most preferred embodiment, the isosorbide monomer component is treated to reduce the sorbitol content to an amount that is undetectable in the isosorbide monomer component.

As described herein, where the isosorbide monomer component is tested for the presence of sorbitol the testing mechanism is not particularly limited and can be accomplished by known methods of determining the presence and concentration of sorbitol. In a preferred embodiment, as described above, the testing step is performed by HPLC. The step of testing preferably occurs at the location of formation of the isosorbide-containing polycarbonate. However, the step of testing may be performed "offsite", for example at the isosorbide production facility or somewhere in between for example at a third party certification agency, laboratory, or warehouse where the isosorbide product is tested and assigned a sorbitol grading value or a sorbitol content level. In this later embodiment where the monomer is assigned the sorbitol grading value "offsite", the treating of the monomer component will proceed based on the assigned sorbitol grading value. For example where the isosorbide is assigned a sorbitol grading value of less than 0.10 mol % at an offsite location (e.g. a third party chemical supplier), that isosorbide monomer component may be ordered from the supplier and used in the production of polycarbonate and such use falls within the scope of the step "testing the first monomer component for the presence of sorbitol, and if sorbitol is present, treating the first monomer component to reduce the level of sorbitol to an amount less than 0.10 mole % in the first monomer component".

The step of "treating the first monomer component to reduce the level of sorbitol to an amount less than 0.10 mole % in the first monomer component" likewise is not particularly limited and can occur by known purification methods such as washing, extraction, distillation, or combinations thereof. The step of testing and/or treating the isosorbide monomer component may occur before, during, or after the formation of the reaction mixture as recited in step (iii) above. Similar to the description of the testing step described above, the treatment step may occur at an "offsite" location and the treated isosorbide product then used in the "onsite" polymerization process. This offsite testing and/or treatment falls within the scope of the present invention.

The step of "allowing the reaction mixture to react under polymerization conditions to build molecular weight" is likewise not particularly limited. As described herein the methods of the present invention relate to polymerization of monomer components comprising isosorbide and those that create carbonate linkages within the polymer. The type of reaction and reaction conditions of the polymerization reaction are not particularly limited as such polymerization reactions are well known in the art. In a preferred embodiment, however, the polycarbonate is prepared in a melt polymerization reaction using an activated diaryl carbonate, such as an ester-substituted diaryl carbonate (e.g. BMSC). Melt polymerization reactions that create the transesterification between the free hydroxyl ends of dihydroxy compounds with the carbonate source are known and are not particularly limited with respect to the present invention. For example, U.S. patent application Ser. Nos. 11/863,659, 11/427,861, and 11/427,885, which are incorporated herein by reference for all purposes, disclose preferred processes and catalysts for the melt production of polycarbonate suitable for use with the methods of the present invention.

A second embodiment of the present invention provides a further method of producing an isosorbide-containing polycarbonate. The method comprises the steps of:

(i) preparing a polycarbonate by reacting isosorbide with a diaryl carbonate in the presence of a polymerization catalyst under polymerization conditions, and (ii) performing a polycarbonate treatment step selected from the group consisting of: (a) testing the polycarbonate prepared in step (i) for the presence of a sorbitol-derived color body associated with a $^1$H-NMR peak located at a chemical shift of about 2.55 ppm in a $^1$H-NMR spectrum, and if the sorbitol-derived color body is present, treating the polycarbonate prepared in step (i) to reduce the level of the sorbitol-derived color body, and (b) treating the polycarbonate prepared in step (i) to reduce the level of the sorbitol-derived color body, thereby producing an isosorbide-containing polycarbonate product.

In this second embodiment isosorbide-containing polycarbonate is prepared and then is subsequently tested for the presence of, and treated if necessary to reduce the level of, the sorbitol-derived color body. Alternatively, the polycarbonate is simply treated, without testing for the presence of the sorbitol-derived color body.

The step of preparing polycarbonate as with the first embodiment is not particularly limited. The isosorbide-containing polycarbonate may be prepared offsite at a polycarbonate production facility (e.g. by a third party) and then shipped to the polycarbonate treatment site to perform treatment step (ii). In a preferred embodiment, however, the isosorbide-containing polycarbonate is prepared onsite by a melt polymerization reaction using an activated diaryl carbonate such as BMSC. Preferably directly after preparation, the polycarbonate is then subjected to treatment step (ii).

Where the isosorbide-containing polycarbonate is tested for the presence of the sorbitol-derived color body, the testing mechanism is not particularly limited and can be accomplished by known methods of detecting the presence of color bodies or components within samples. For example the polycarbonate can be tested for the presence of the sorbitol-derived color body using $^1$H-NMR analysis, UV vis spectra analysis, or X-Rite analysis. Alternatively, because the sorbitol-derived color body can create visually observable color within the product polycarbonate, the isosorbide-containing polycarbonate can be compared with known color standards for polycarbonate to determine if the color body is present and its concentration should be reduced. In this later embodiment comparative samples of isosorbide-containing polycarbonate can be prepared that contain quantified amounts of the sorbitol-derived color body. These samples are then used to compare produced isosorbide-containing polycarbonate to visually determine the content of the sorbitol-derived color body within the produced polycarbonate. Treatment steps then can be designed and conducted within the scope of the present invention based upon the visual comparison of the produced polycarbonate to the sample. In a preferred embodiment the concentration of the sorbitol-derived color bodies is preferably quantified using $^1$H-NMR deuterated chloroform ($CDCl_3$) as a solvent and TMS as the reference as described below.

The step of "treating the polycarbonate prepared in step (i) to reduce the level of the sorbitol-derived color body" likewise is not particularly limited and can occur by known purification methods such as washing, extraction, and/or distillation. In a preferred embodiment however, the polycarbonate is treated to reduce the presence of the sorbitol-derived color body by dissolving the polycarbonate in a solvent and precipitating the polycarbonate from solution. The present Inventors have found that the solvent is not particularly limited. However, in a preferred embodiment the solvent is a chlorinated solvent, for example a solvent selected from the group consisting of: chloroform and dichloromethane.

In a preferred embodiment, the step of "treating the polycarbonate prepared in step (i) to reduce the level of the sorbitol-derived color body" is performed to reduce the concentration of the sorbitol-derived color body in the polycarbonate produced in step (i) such the polycarbonate product has less than 75% (e.g. less than 50%, more preferably less than 25%, for example less than 5%) of the area contained under the $^1$H-NMR peak located at a chemical shift of about 2.55 ppm in a $^1$H-NMR spectrum of the product polycarbonate than does the polycarbonate produced in step (i).

In another preferred embodiment, the step of "treating the polycarbonate prepared in step (i) to reduce the level of the sorbitol-derived color body" is performed to decrease the YI of the polycarbonate by a value of 2 or more (e.g. by a value of 5, 10, 15, 20, 25, 30, or more) as measured using UV-Vis spectrometry methods described herein.

The Isosorbide-Containing Polycarbonate:

Without being bound by a particular mechanism, the present Inventors believe that sorbitol reacts to form sorbitol-derived color bodies under elevated polymerization reaction temperatures and long reaction times. The Inventors have identified that the sorbitol-derived color bodies have a detectable presence in isosorbide-containing polycarbonate that relates to the color properties of the polymer and to the presence and concentration of sorbitol in the isosorbide monomer raw material. By using the methods of the present invention one is able to produce an isosorbide-containing polycarbonate that has superior color properties compared to polycarbonates prepared using past methods. The present Inventors have found that in order to provide isosorbide-containing polycarbonate having good color that the polycarbonate should contain no more than a the below defined maximum allowable amount of sorbitol-derived color bodies.

Figure 5:
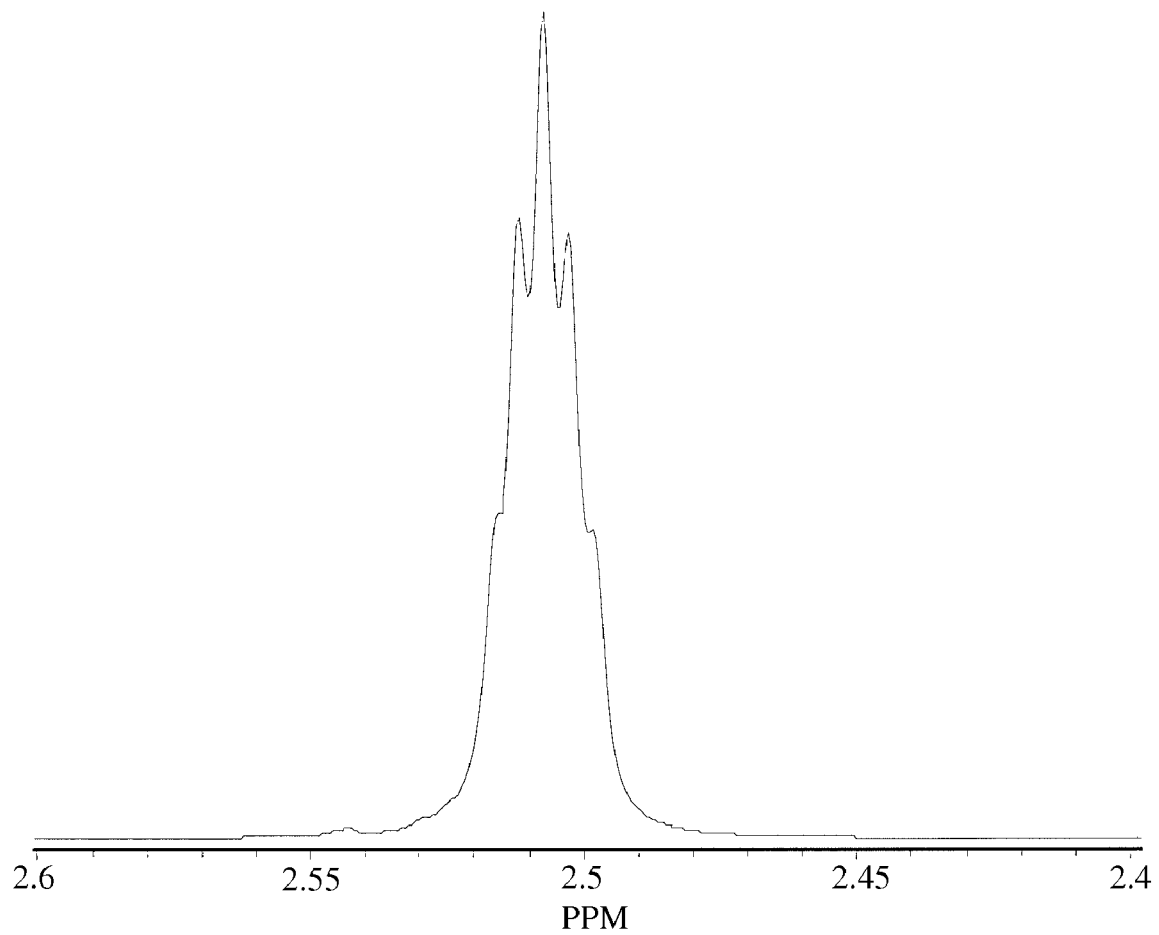

Using the $^1$H-NMR analysis described below polymer samples were analyzed in deuterated chloroform (50 to 70 mg polymer in 1.0 ml CDCl$_3$) containing 0.1 wt % tetramethylsilane (TMS) as reference from which chemical shifts in ppm were measured. The Inventors have found that the sorbitol-derived color body is associated with a peak located at a chemical shift of about 2.55 ppm in an $^1$H-NMR spectrum. See FIG. 5 for a representative example of the peak at about 2.55 ppm in a $^1$H-NMR spectrum. Using $^1$H-NMR analysis, the concentration of the sorbitol-derived color body can be quantified as a relative peak area by determining the integrated area of a peak associated with the color body relative to that of three peaks associated with the incorporated isosorbide residues. The relative area of the peak at about 2.55 ppm has been found to correlate strongly with sorbitol-derived color bodies and with the color of the isosorbide-containing polymers made using reaction mixtures containing varying amounts of sorbitol.

In one embodiment, the amount or a quantified concentration of the sorbitol-derived color body can be determined by visually comparing the produced isosorbide-containing polycarbonate to isosorbide-containing polycarbonate "standards" that contain a previously quantified amount of the sorbitol-derived color body. In another embodiment the amount or a quantified concentration of the sorbitol-derived color body can be determined by comparing the relative area of the peak at about 2.55 ppm in a $^1$H-NMR spectrum of the isosorbide-containing polycarbonate to the relative areas of other peaks contained in the spectrum that are associated with other components of the polycarbonate (e.g. the isosorbide, the diaryl carbonate, and/or other monomer components). For example, in order to give an amount or quantify the concentration of the sorbitol-derived color body relative to the incorporated isosorbide, the isosorbide peak at about 4.87 ppm assigned to the two protons (assigned to methine protons at C-1 and C-4 in the figure below) can be integrated, and the integrated area set at a value of 1000. Two other isosorbide (IS) peaks at about 4.50 ppm (assigned here to the coupling between C-5 proton and one of C-6 methylene protons in the figure below) and about 4.56 ppm (assigned here to the coupling between C-2 proton and one of C-3 methylene protons in the figure below) can also integrated, and their integrated areas set to values of 500 each because each peak is assigned to one proton. This process then establishes three isosorbide peaks at about 4.87 ppm, 4.56 ppm, and 4.50 ppm as constant relative internal standards of area 1000, 500, and 500, respectively (e.g. a total area of 2000). The peak at about 2.55 ppm associated with the sorbitol-derived color body can then be integrated, and the area of this peak relative to those of the three isosorbide peaks (e.g. an internal standard area of 2000) can be obtained and quantified from the $^1$H-NMR spectrum. The chemical structure of isosorbide is:

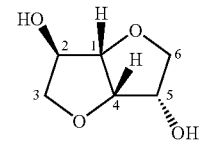

The polycarbonate of the present invention comprises repeat units derived from isosorbide and a residue (e.g. methyl salicylate) derived from an activated diaryl carbonate (e.g. BMSC). As described above, the polycarbonate has $^1$H-NMR peaks associated with the repeat units derived from isosorbide located at chemical shifts of about 4.50 ppm, 4.56 ppm, and 4.87 ppm in a $^1$H-NMR spectrum using deuterated chloroform as a solvent and TMS as the reference. The present Inventors have found that in order for the polycarbonate to have good color properties, the polycarbonate should contain no more than a maximum allowable amount of sorbitol-derived color bodies. If the color bodies are present the polycarbonate will have a $^1$H-NMR peak associated with the sorbitol-derived color bodies located at a chemical shift of about 2.55 ppm in a $^1$H-NMR spectrum using deuterated chloroform as a solvent and TMS as the reference.

The maximum allowable amount of sorbitol-derived color bodies are present in the polycarbonate when the integrated area of the $^1$H-NMR peak associated with the sorbitol-derived color bodies divided by the combined integrated areas of the $^1$H-NMR peaks associated with the repeat units derived from isosorbide is 0.025. For example, using the above constant internal standard method of assigning the three peaks associated with isosorbide a combined area value of 2000, the peak at about 2.55 ppm associated with the sorbitol-derived color bodies will contain an area of 50 (e.g. 50/2000=0.025) when the polycarbonate contains the maximum allowable amount of sorbitol-derived color bodies. In more preferred embodiments the polycarbonate will comprises less than the maximum allowable amount of sorbitol-derived color bodies. In these more preferred embodiments, the integrated area of the $^1$H-NMR peak associated with the sorbitol-derived color bodies divided by the combined integrated areas of the $^1$H-NMR peaks associated with the repeat units derived from isosorbide is less than 0.02 (e.g. 40/2000=0.02), for examples less than 0.01 (e.g. 20/2000=0.01), and more preferably less than 0.005 (e.g. 10/2000=0.005). In a most preferred embodiment the polycarbonate contains no detectable amount of sorbitol-derived color bodies.

The measurement of color properties of the polycarbonate is not particularly limited. For example, the color properties of solid polymer samples can be measured by a spectrometer such as a spherically-based, 0/45 or 45/0, or multi-angle spectrophotometer or a calorimeter. In one embodiment, they are measured by an Xrite Teleflash 130 instrument, specifically by an Xrite Teleflash 130 instrument using the conditions given in the example section below. The color properties of irregularly shaped polymer samples may be measured after dissolution by solution spectroscopy. In a preferred embodiment the color properties of polycarbonate are preferably measured using UV-Vis spectroscopy and the conditions expressed below in the example section.

EXAMPLES

Having described the invention in detail, the following examples are provided. The examples should not be considered as limiting the scope of the invention, but merely as illustrative and representative thereof.

(WE) as used herein is understood to mean "working example" while (CE) is understood to mean "comparative example". The terms "working" and "comparative" are simply used to demonstrate comparisons to other examples. Working and comparative examples may or may not be an example within the scope of the present invention.

In the following examples the following processes, measurements, and experimental tests were performed.

$^1$H-NMR Analysis Procedure

Nuclear magnetic resonance spectroscopy was used to detect and characterize the chemical structure of the sorbitol-derived color body and to calculate the concentration of the color body relative to that of isosorbide based on the relative areas of the color body peak and three isosorbide peaks.

Samples were analyzed in deuterated chloroform (50 to 70 mg polymer in 1.0 ml CDCl$_3$) containing 0.1 wt % tetramethylsilane (TMS) as reference from which chemical shifts in ppm were measured. Spectral analysis and quantification using $^1$H-NMR was carried out as follows. $^1$H-NMR spectra were recorded on a Bruker Avance Ultrashielded 400 MHz (1H-Frequency) system equipped with a 5 mm QNP Probehead. The following settings were used:

Acquisition time: 2.56 secs

Number of scans: 256

Recycle delay: 10 secs

Experiment: 30 degr. $^1$H-pulsewidth

Temperature: 44° C.

The spectra were obtained by Fourier transformation of the Free Induction Decay (FID) after application of 0.3 Hz apodization and phase correction. The chemical shift of the TMS proton was set at 0.0 ppm.

The concentration of the color body derived from sorbitol was quantified as a relative peak area by determining the integrated area of a peak associated with the color body relative to that of three peaks associated with the incorporated isosorbide residues. The relative area of the peak at about 2.55 ppm (See FIG. 5 for an example of peak at about 2.55 ppm found in 1H-NMR analysis) has been found to correlate strongly with the color of the polymers obtained by the spiking of polymerization reactions with sorbitol. In order to give a concentration of the color body relative to the incorporated isosorbide residues, the isosorbide peak at about 4.87 ppm assigned to the two protons (assigned to methine protons at C-1 and C-4) was integrated, and the integrated area was set at a value of 1000. Two other IS peaks at about 4.50 ppm (assigned here to the coupling between C-5 proton and one of C-6 methylene protons) and about 4.56 ppm (assigned here to the coupling between C-2 proton and one of C-3 methylene protons) were also integrated, and their integrated areas were set to values of 500 each because each peak is assigned to one proton. This process then established the three isosorbide peaks at about 4.87 ppm, 4.56 ppm, and 4.50 ppm as constant relative internal standards of area 1000, 500, and 500 respectively (e.g. a total area of 2000). The peak at about 2.55 ppm due to the sorbitol-derived color body was then integrated, and the area of this peak relative to those of the three isosorbide peaks (e.g. a total of 2000) was obtained for the $^1$H-NMR spectrum. The chemical structure of isosorbide is:

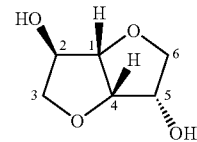

UV-Vis Procedure

UV-Vis spectroscopy was used to quantify the color properties of the polymers prepared with and without spiking of sorbitol into the polymerization process. Polymer sample solutions were prepared by dissolving 0.5 g of the polymer sample in 10 ml of chloroform (5 mass/volume % solution). A UV/Vis spectrometer Lambda 800 from PerkinElmer® Instruments, the software UV Winlab Version 3.00.03 and the following settings were used:

Absorbance spectra: from 380 nm to 720 nm in intervals of 10 nm

Ordinate mode: absorbance

Intergration: 1.0 nm

Scan speed: 483.8 nm/min

The yellowness index YI of the polymers was then calculated from the UV/Vis spectrum according to the method of ASTM D 1925.

Size Exclusion Chromatography (SEC) Measurements:

Equipment:
    Agilent 1100 Series degasser
    Agilent 1100 Series Isocratic pump
    Agilent 1100 Series Auto sampler
    Agilent 1100 Series Column compartment
    ODS Hypersil column
    Personal computer with SEC data acquisition software
    Analytical balance
    Standard laboratory equipment and glass ware
    Syringe 10 ml
    SEC vials Sample Preparation:

Weigh approximately 1 mg/mL of polymer and dissolve it in dichloromethane. Shake for at least 10 minutes. Introduce liquid into a SEC vial via a syringe with a filter tip to avoid solid particles.

Instrument Method Configuration.
Column: ODS Hypersil column
Temperature: 35° C.
Data acquisition: Signal Wavelength 254nm/peakwidth: >0.1 min (2 s)
Eluent: $CH_2Cl_2$ (100%), no gradient elution
Flow rate: 0.3 ml/min.
Pressure limits: from 4 bar to 170 bar
Injection volume: 10.0 µl
Total Run Time: 15.00 min.
Internal Standard correction: flowmarker=0.625 mL of toluene in 2.5 L CH2Cl2
wavelength 254 nm
ref. Position 4.97 min/max deviation 5%.

Small-Scale Melt Polymerization Experiments

Samples of isosorbide (IS) containing (homo/co/ter) polymers were prepared in using the followings steps. Small-scale polymerization reactions were carried out in glass tube reactors, which had the same vacuum system. Before charging the monomers the glass reactor tubes were soaked in 1M HCl for at least 24 hours to remove any sodium present at the surface of the glass. After this acid bath the glass tubes were rinsed using 18.2 MW (Milli-Q quality) water for at least 5 times. According to the desired make up of the polymer the batch reactor tubes were charged at ambient temperature and pressure with 25.00 grams of solid BMSC and the required number of grams of isosorbide, $C_{36}$ diacid, and Bisphenol-A (BPA). After this the reactor system was sealed shut, the system was deoxygenated by briefly evacuating the reactors and then introducing nitrogen. This process was repeated three times. 100 µl of the catalyst solution (alpha catalyst solution: 0.5 M aqueous sodium hydroxide and diluted to the required concentration 40 µEq) was added to each reactor as an aqueous solution.

The temperature of the reactor was maintained using a heating mantle. The pressure over the reactor was controlled by a nitrogen bleed into the vacuum pump downstream of the distillate collection flasks and measured with a pressure gauge. The reactor was brought to near atmospheric pressure and reaction time is started at the same moment as the heaters are switched on. The reactions were carried out according to the conditions in Table below. In the below Table, "Tr" is the set point temperature of the reactor; and "To" is the set point temperature of the overhead. The vacuum system removed the methyl salicylate by-product, which was condensed in condensers. The product was recovered by removing a drain nut at the bottom of each reactor.

The standard reaction profile is below.

| Time | Remarks |
| --- | --- |
| 0:00:00 | $T_r$ reached 170° C.; $T_o$ reached 100° C., pressure reached 100 kPa |
| 0:06:00 | Set stirrer to approximately 40 rpm |
| 0:15:00 | Set Tr to 230° C. |
| 0:30:00 | Set P at 50 kPa |
| 0:50:00 | Set Tr at 270° C. and P at <0.2 kPa |
| 1:04:00 | Open reactor under nitrogen flow and stop reaction. Drain polymer from reactor. |

Example 1

Sorbitol Spiking in IS-(Homo/Co/Ter)Polymers

Different amounts of sorbitol were added to reaction mixtures to form IS-homopolymers, IS-copolymers, and IS-terpolymers to evaluate the influence of sorbitol on the properties of these polymers. The color properties were measured using UV/Vis spectroscopy method described above. $^1$H-NMR analysis was performed on the prepared polymers and it was determined that polymer color was not related to byproducts from using BMSC as the carbonate source. In the reaction mixture, some molar percent of isosorbide was replaced with sorbitol to simulate an isosorbide with different amounts of sorbitol impurities. The reactions were done on the melt polymerization unit with the standard reaction profile with a molar ratio of 1.01.

| Formulation | Example | Sorbitol spiking mol %/IS | Mw (PC) g/mol | Mn (PC) g/mol | PDI | L* | a* | b* | YI |
| --- | --- | --- | --- | --- | --- | --- | --- | --- | --- |
| Homopolymer BMSC (101)/IS 40µEq NaOH | WE 1 | 0.00 | 17628 | 7889 | 2.2 | 98.8 | 0.04 | 1.3 | 2.4 |
| | CE 1 | 0.10 | 17347 | 7827 | 2.2 | 97.9 | −0.33 | 4.7 | 8.4 |
| | CE 2 | 0.30 | 11734 | 5366 | 2.2 | 96.2 | −0.50 | 9.4 | 16.8 |
| | CE 3 | 0.50 | 14934 | 6345 | 2.4 | 94.6 | −0.53 | 14.2 | 25.2 |
| | CE 4 | 1.00 | 15119 | 6858 | 2.2 | 93.9 | −0.96 | 19.0 | 32.8 |
| | CE 5 | 5.00 | NM | NM | NM | 43.1 | 12.63 | 49.0 | 125.3 |
| Terpolymer BMSC (101)/ IS(80)/BPA(13)/$C_{36}$ diacid(7) 40µEq NaOH | WE 2 | 0.00 | 20913 | 8559 | 2.4 | 99.7 | 0.10 | 0.3 | 0.6 |
| | CE 6 | 0.05 | 19999 | 6284 | 2.4 | 99.3 | −0.26 | 2.0 | 3.4 |
| | CE 7 | 0.10 | 15258 | 6560 | 2.3 | 98.9 | −0.38 | 3.4 | 5.9 |
| | CE 8 | 0.15 | 16130 | 6916 | 2.3 | 98.3 | −0.28 | 4.2 | 7.5 |
| | CE 9.1 | 0.20 | 15556 | 6742 | 2.3 | 97.7 | −0.37 | 6.2 | 11.0 |

The color properties of both the homo- and ter-polymers are plotted in FIGS. 1 (homopolymers) and 2 (terpolymers).

Copolymers were also prepared using IS, various comonomers, two levels of sorbitol were spiked to the samples (i.e. none and 0.1 mol %). The properties of these copolymers are given in the table below.

| | Formulation | Mw (PC) | Mn (PC) | PDI | L* | a* | b* | YI |
|---|---|---|---|---|---|---|---|---|
| | | g/mol | g/mol | — | — | — | — | — |
| WE 3 | IS (50)/BPA(50) | 19427 | 8666 | 2.2 | 99.6 | −0.06 | 0.6 | 1.1 |
| | IS (50)/BPA(50) | 16293 | 7117 | 2.3 | 99.7 | −0.11 | 0.9 | 1.5 |
| CE 9.2 | IS (50)/BPA(50) + 0.1 mol %/IS sorbitol | 17097 | 7648 | 2.2 | 98.4 | −0.70 | 4.2 | 7.2 |
| | IS (50)/BPA(50) + 0.1 mol %/IS sorbitol | 17429 | 7707 | 2.3 | 98.6 | −0.46 | 4.6 | 8.1 |
| WE 4 | IS (50)/Resorcinol(50) | 14798 | 6559 | 2.3 | 95.5 | 0.05 | 3.9 | 7.3 |
| | IS (50)/Resorcinol(50) | 14711 | 6520 | 2.3 | 98.9 | −0.24 | 2.9 | 5.1 |
| CE 10 | IS (50)/Resorcinol(50) + 0.1 mol %/IS sorbitol | 14422 | 6314 | 2.3 | 96.7 | −0.99 | 11.1 | 19.1 |
| | IS (50)/Resorcinol(50) + 0.1 mol %/IS sorbitol | 13572 | 6013 | 2.3 | 97.8 | −0.88 | 8.1 | 14.0 |
| WE 5 | IS(93)/C36diacid(7) | 26273 | 10704 | 2.5 | 99.6 | −0.17 | 1.2 | 2.0 |
| | IS(93)/C36diacid(7) | 27731 | 11193 | 2.5 | 99.1 | −0.39 | 2.9 | 5.0 |
| CE 11 | IS(93)/C36diacid(7) + 0.1 mol %/IS sorbitol | 27968 | 10841 | 2.6 | 98.1 | −0.92 | 5.9 | 10.0 |
| | IS(93)/C36diacid(7) + 0.1 mol %/IS sorbitol | 27314 | 10973 | 2.5 | 98.7 | −0.46 | 4.2 | 7.3 |
| WE 6 | IS(70)/C36diol(30) | 16248 | 6599 | 2.5 | 96.2 | 0.04 | 1.2 | 2.3 |
| | IS(70)/C36diol(30) | 13368 | 5370 | 2.5 | 95.3 | 0.05 | 1.7 | 3.3 |
| CE 12 | IS(70)/C36diol(30) + 0.1 mol %/IS sorbitol | 14118 | 6114 | 2.3 | 95.8 | −0.07 | 2.3 | 4.2 |
| | IS(70)/C36diol(30) + 0.1 mol %/IS sorbitol | 14341 | 6406 | 2.2 | 94.1 | 0.13 | 2.8 | 5.4 |

Figure 2:
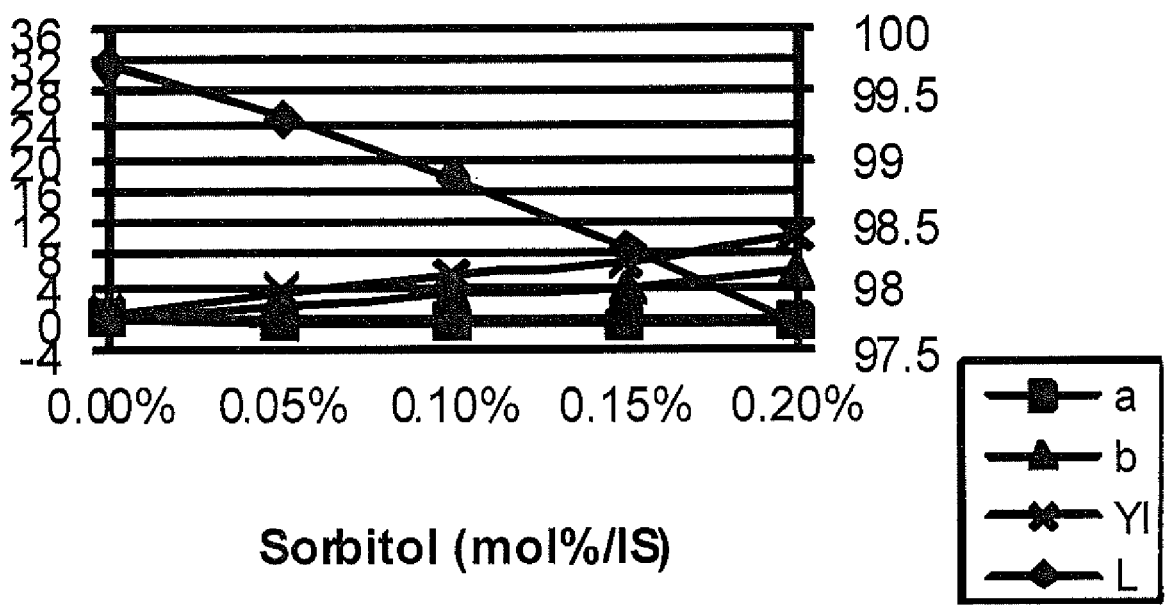

As can be seen in the tables above and in FIGS. 1 and 2, the color properties of the polymer deteriorates as the amount of sorbitol in the reaction mixture increases. Sorbitol has an adverse effect on the color of the different polymer formulations when spiked at levels at or above 0.1 mole % relative to the isosorbide content of the formulation. There does not appear to be branching with added sorbitol. Furthermore the molecular weight decreases with the increase of the amount of sorbitol but there does not appear to be significant change in the by-product formation, except for the increase in the content of IS-OH and decrease in the content of IS-SalOH for the homopolymer formulation.

As demonstrated, the addition of sorbitol to the homopolymer, copolymer, and terpolymer reaction mixture formulations results in a yellowish-brown coloration of the polymer. Therefore it has been demonstrated that the amount of sorbitol that can be tolerated in isosorbide as an impurity should be limited (e.g. to an amount less than 0.10 mol %, more preferably less than 0.05 mol %) because sorbitol has a negative effect on polymer color quality.

Figure 6A:
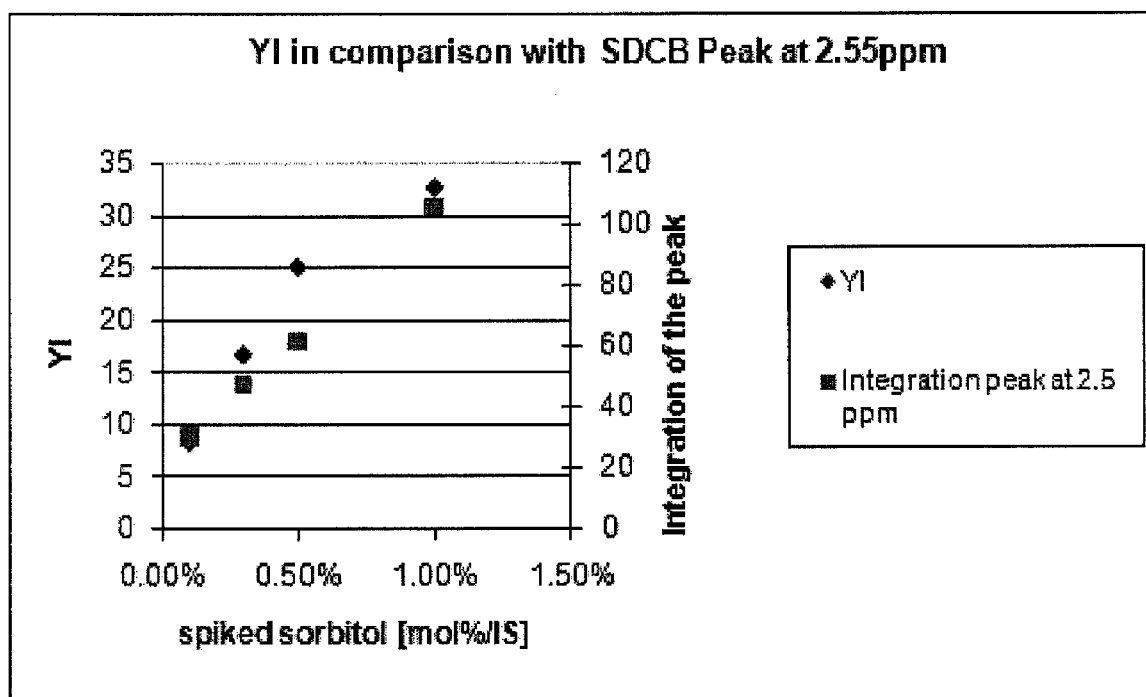
Figure 6B:
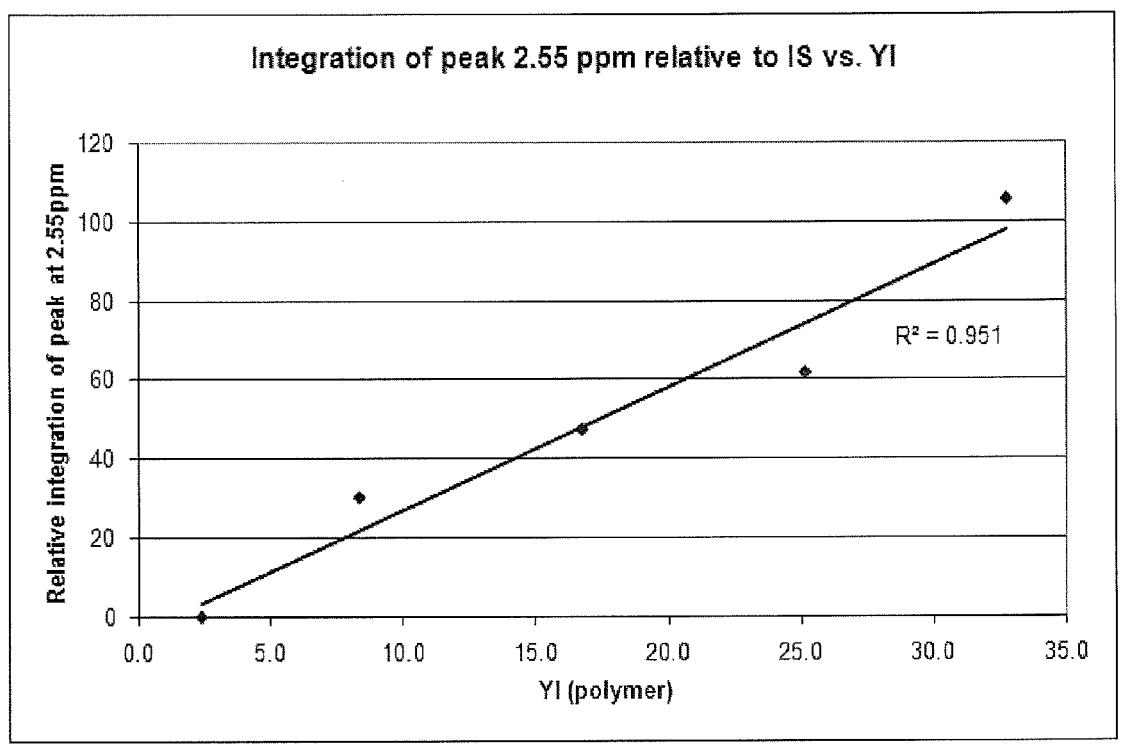

The polymer prepared in Working Example 1 and Comparative Examples 1 to 4 was also analyzed using $^1$H-NMR spectroscopy to detect the sorbitol-derived color body and to calculate the concentration of the color body relative to that of isosorbide based on the relative areas of the color body peak and three isosorbide peaks according to the $^1$H-NMR analysis procedure described above. FIG. 6A shows a graph comparing the YI of the polymer samples to the quantified concentration of the sorbitol-derived color body and to the amount of sorbitol spiked to initial reaction mixtures. FIG. 6B shows a graph comparing the YI of the polymer samples to the quantified concentration of the sorbitol-derived color body.

Example 2

Dissolution and Precipitation of Polymer to Remove Low Mw Color Bodies

In this example the polymer formed in Comparative Example 5 above was treated to reduce the concentration of the sorbitol-derived color body. The treatment step included the dissolution and precipitation of the polymer from solution. The dissolution and precipitation method was used to separate the polymer from the low molecular weight color body species found as "residuals" in the polymer samples. In this method, sample solutions were prepared by dissolving 0.5 g of the polymer sample (e.g. from polymerization spiked with sorbitol) in 5 ml of chloroform (5 mass/volume % solution). After dissolution, 10 ml of methanol were added to the sample solution in order to precipitate the polymer. The precipitated polymer and the solution containing the color body were then separated by filtration.

Figure 7:
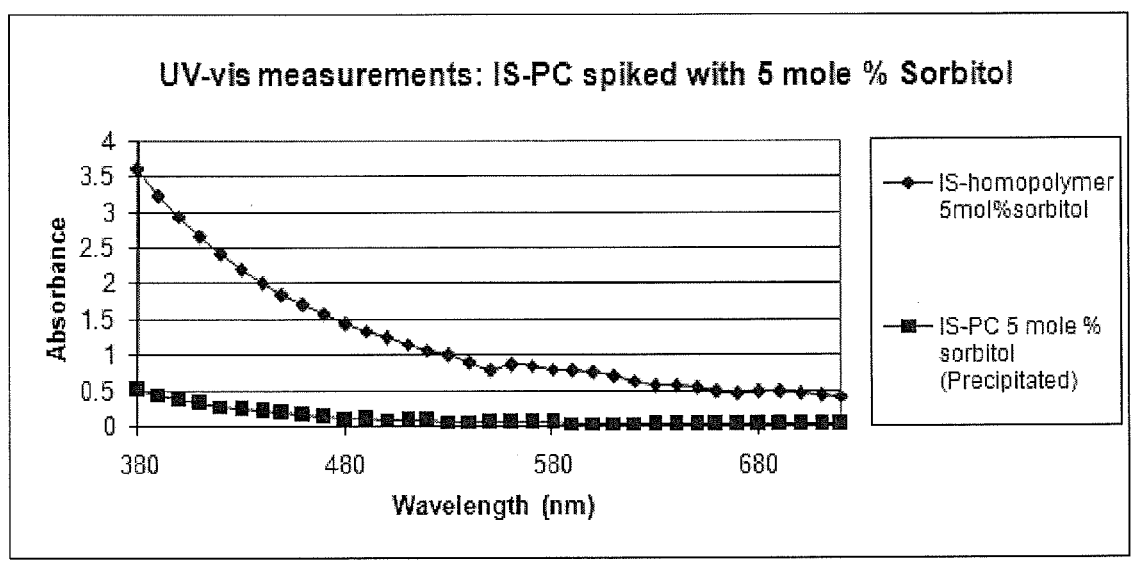
Figure 8:
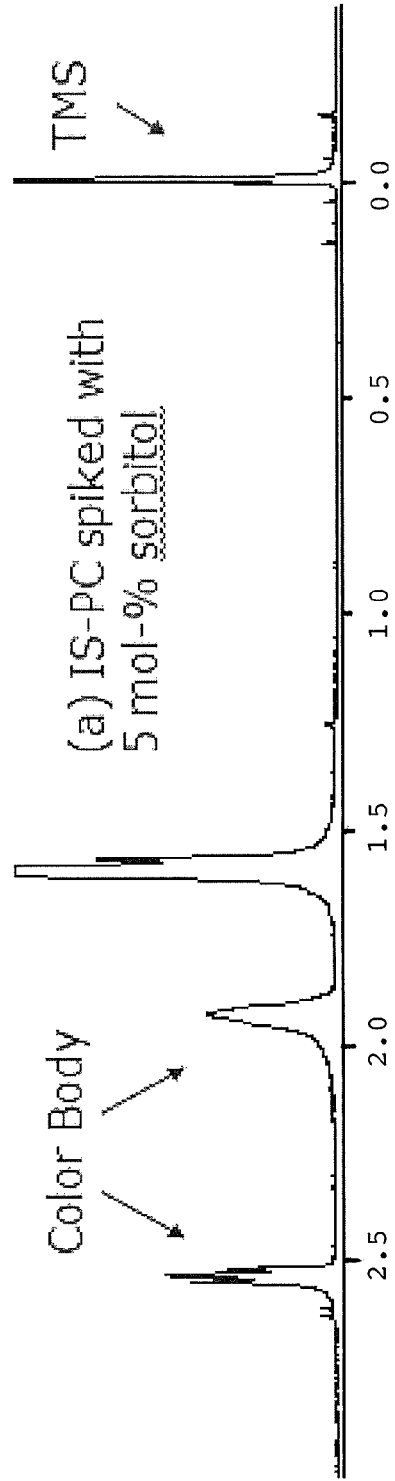
Figure 9:
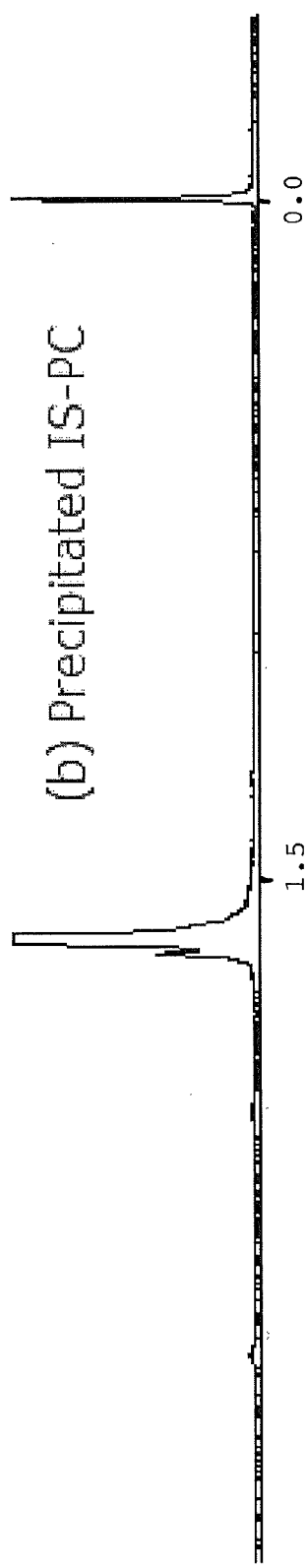

Each solution (e.g. before and after precipitation) and the precipitated polymer, were analyzed using $^1$H-NMR and UV-Vis measurements to determine if the color body was present or absent. See FIGS. 8 to 10. FIG. 8 shows the $^1$H-NMR spectra of the solution after dissolution of the polymer and prior to precipitation containing the peak at about 2.55 ppm. FIG. 9 shows that the $^1$H-NMR peak at about 2.55 ppm assigned to the color body is no longer detectable in the spectra of the precipitated polymers after dissolution/precipitation. FIG. 10 shows that the peak at about 2.55 ppm is observed in the solution spectra of the extracted residual species. In the UV-Vis measurements (see FIG. 7) it was found that the color was removed from the polymer by the dissolution/precipitation process. This example demonstrates that the sorbitol-derived color body can be freely removed from the polymer.

Applicants note that another peak located at about 1.92 ppm in the $^1$H-NMR spectra is present in pretreated polymer and is also removed after the dissolution/precipitation treatment step. This peak is also believed to be associated with the sorbitol-derived color body and may be related to a free —OH feature of the color body. Because this peak is relatively broad and featureless single peak little information can be ascertained from it. Also, broad —OH peaks tend to be less useful for analysis because they may shift or otherwise alter due to hydrogen-bonding interactions and solvent interactions, among other interactions. Therefore the peak at about 2.55 ppm is believed to be more useful for analysis of the sorbitol-derived color body.

Example 3

Figure 3:
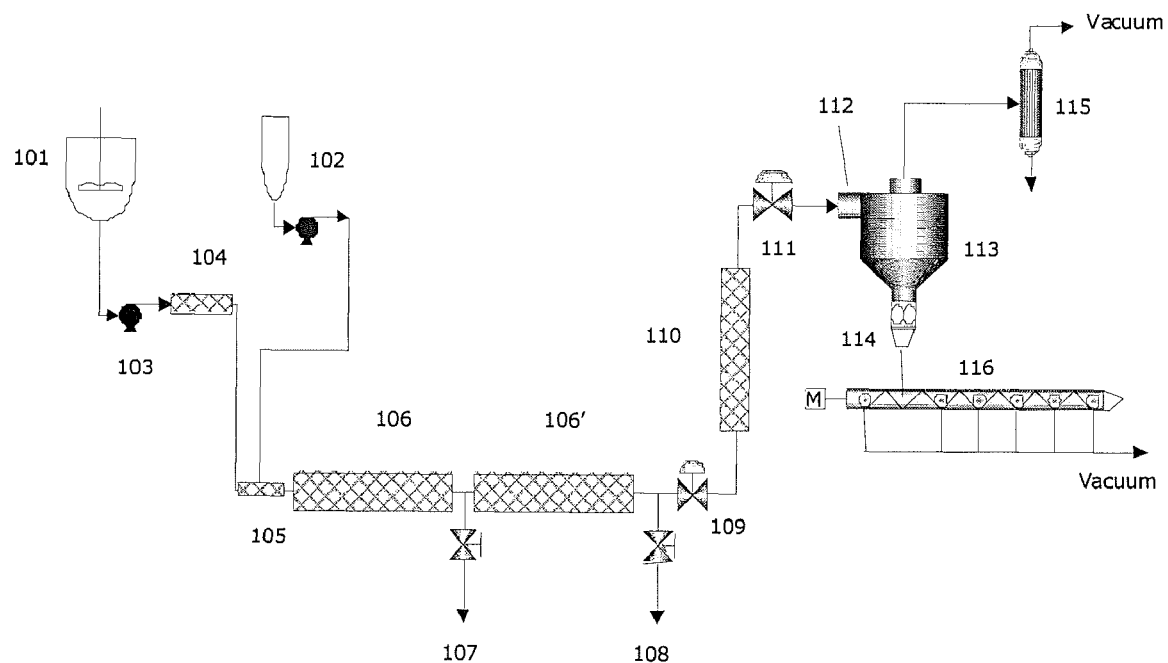
FIG. 3 is a schematic diagram of a reactor system used in the example section.

Polymerization Using a Plug Flow Reactor/Flash Devolatilization/Reactive Extruder Hybrid System Shown Schematically in FIG. 3

A terpolymer of isosorbide, BPA and $C_{36}$ diacid was made in a 80/13/7 (mole %) composition. In this system a stirred tank 101 is charged at ambient temperature and pressure with the isosorbide (38,914 g) and BPA (9,879 g) diol and C36 diacid (13,210 g) diacid monomers, and solid BMSC (112, 144 g). The standard BMSC/(diol/diacid) monomer molar ratio is 1.02. After loading the reactor the catalyst solution (sodium hydroxide aqueous solution in an amount of 225 micromoles per total mole diol+diacid) is added directly into the stirred tank 101. After this the monomer mix tank 101 is sealed shut. The system is deoxygenated by briefly evacuating the monomer mix tank 101 followed by introducing nitrogen. This process is repeated three times. Then, in order to melt the diaryl carbonate and prepare the oligomer, the pressure is set to 800 mbar and the temperature is increased to about 175° C. The liquid mixture is continuously stirred and left to react until an exothermic peak is observed in the stirred tank 101.

Using a piston pump 103, the oligomer is then fed to a pre-heater 104. The oligomer is mixed in a small 10 cm intensive mixing zone 105. The oligomer is than pumped through the plug flow reactor 106. The PFR 106 temperatures typically range between 150 and 230° C., the residence time in the plug flow reactor 106 varies between 2 and 10 minutes. The pressures typically range between about 400 and 600 kPa, in order to ensure that no vapor phase is formed. The oligomer is then fed to the pre-heater 110. The temperature in this pre-heater 110 ranges between 150 and 240° C. The pressure is kept below 50 kPA in order to start evaporation of methyl Salicylate (MS). The concentration of MS remaining in the liquid phase (oligomer) varies between about 10 and 20% (w/w). Then, the oligomer mixture is fed through the distributor 112 to the flash vessel 113. In the flash vessel, additional MS is removed and molecular weight is further increased. In the flash vessel the pressure typically varies between 5 and 30 kPa, and the temperature is kept between 150 and 240° C.

The MS evaporated leaves the flash vessel and condenses in condenser 115. It is collected as a liquid in a storage vessel. The oligomer is pumped out of the flash vessel to the extruder 116 using the gear pump 114. The amount of MS in this oligomer varies between 0.5 and 20% (w/w), depending on the temperature and pressure settings of the flash vessel.

The extruder used is a ZSK 25 extruder. The oligomer is fed to the extruder at a rate between 5 and 25 kg/h. The screw speed varies between 300 and 500 rpm. The barrels of the extruder are set at 260° C., the die head at 270° C. The ZSK 25 (type) extruder is equipped with a high vacuum system to further remove the methyl Salicylate formed as a byproduct in the polycondensation reaction. Polycarbonate is removed from the extruder. The set points of this process are shown in the table below.

|  | # |  | UOM | Run 1 | Run 2 | Run 3 |
| --- | --- | --- | --- | --- | --- | --- |
| Formulation vessel | 101 | Ratio | [—] | 1.02 | 1.02 | 1.016 |
|  |  | Catalyst | Mol/Mol diol | 7.5E−05 | 6.0E−06 | 7.5E−05 |
|  |  | Oil temp setpoint | [° C.] | 150 | 150 | 150 |
|  |  | Pressure | [—] | ATM | ATM | ATM |
|  |  | Agitator speed | [rpm] | 400 | 400 | 400 |
| Piston pump | 103 | Flow N-210 | [kg/h] | 25 | 25 | 25 |
| Preheater reactor | 104 | Oil temp setpoint | [° C.] | 160 | 160 | 160 |
| SMXL Reactor | 106 | Oil temp setpoint | [° C.] | 160 | 160 | 160 |
|  |  | Pressure setpoint | kPa | 400 | 400 | 400 |
| Preheater devol vessel | 110 | Oil temp setpoint | [° C.] | 200 | 200 | 200 |
|  |  | Pressure setpoint | kPa | 200 | 200 | 200 |
| Devol vessel | 113 | Oil temp setpoint | [° C.] | 190 | 190 | 190 |
|  |  | Pressure setpoint | kPa | 5 | 5 | 5 |
| Devol Extruder | 116 | Screw speed | [rpm] | 300 | 300 | 300 |
|  |  | Barrel temp. setpoint | [° C.] | 260 | 260 | 260 |
|  |  | Die temp. setpoint | [° C.] | 270 | 270 | 270 |
|  |  | Pressure setpoint | kPa | 0.1 | 0.1 | 0.1 |

The influence of sorbitol on the final polymer color is shown in Runs 1-3. In these runs 3 different isosorbides were used with varying sorbitol concentrations. These concentrations are shown in Table 2.

| Isosorbide | |
| --- | --- |
| Run | [sorbitol] (wt %) |
| 1 | N.D. |
| 2 | 0.1 |
| 3 | 0.1 |

Figure 4:
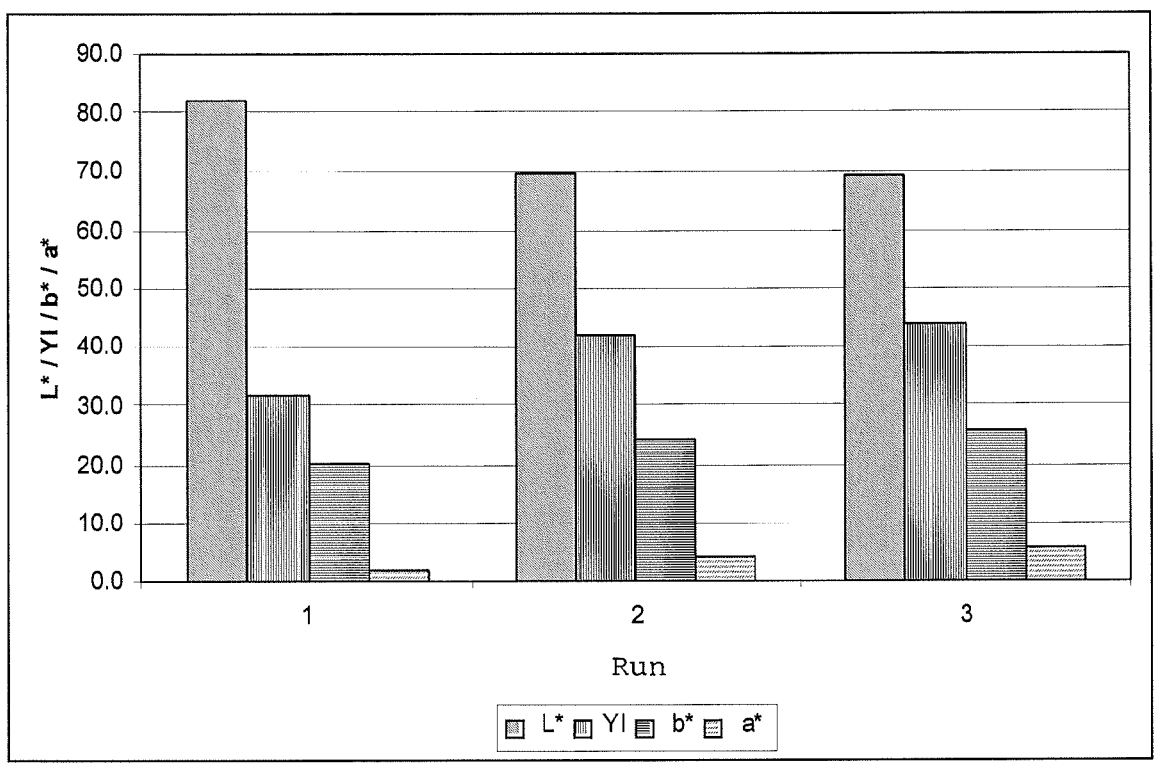

These runs were performed using the plug flow reactor/flash devolatilization/reactive extruder hybrid system described with regard to FIG. 3. In doing so the resulting product was analyzed on color and the results are shown in the tables below and in FIG. 4.

The color of the produced polycarbonate pellets was measured using a XRITE TELEFLASH 130 instrument. A standard light source D65 (neutral daylight, 6500 Kelvin) with a 10° observation angle was used to generate L, a*, and b* values. The pellets were placed in a glass Petri-dish with a diameter of 15 cm and a height of 4 cm. The dish was completely filled with pellets, excess pellets were removed, and the surface pellets gently compressed. Next, the filled dish was placed at a fixed distance and angle from the instrument light source and detector, as determined by the instrumental configuration/geometry. Each sample was measured three times in 3 different dish positions whereby the dish is rotated between each position. The average results are shown in the table below. Run numbers are in the left column.

|   | YI   | L*   | a*   | b*   |
|---|------|------|------|------|
| 1 | 31.7 | 82.0 | 1.78 | 20.2 |
| 2 | 41.9 | 69.6 | 4.32 | 24.3 |
| 3 | 43.9 | 69.1 | 5.84 | 25.5 |

The color of the produced polycarbonate pellets was also measured using UV-Vis spectroscopy as described above. These values are included in the table below.

| | Isosorbide | Solution color of terpolymer: | | | |
|---|---|---|---|---|---|
| | [sorbitol] | (untreated) | | | |
| Run | (wt %) | L | a | b | YI |
| 1 | N.D. | 99.7 | −0.1 | 0.5 | 0.8 |
| 2 | 0.1 | 99.3 | −0.2 | 1.7 | 2.9 |
| 3 | 0.1 | 98.8 | −0.3 | 2.6 | 4.6 |

These runs demonstrate that the use of isosorbide containing no detectable amount of sorbitol provides the best color properties of the final polymer. L* is higher, and YI, b*, and a* are lower compared to the Isosorbide containing 0.1 wt % sorbitol. Sorbitol reacts to form a sorbitol-derived color body during the polymerization.

In a next step, the polymers prepared in Runs 1 to 3 were treated to reduce the concentration of the sorbitol-derived color body. In this step the polymers were dissolved and precipitated from solution. The dissolution and precipitation method was used to separate the polymer from the sorbitol-derived color body species found as "residuals" in the polymer samples. In this step, sample solutions were prepared by dissolving 0.5 g of the polymer sample from the respective run in 5 ml of chloroform (5 mass/volume % solution). After dissolution, 10 ml of methanol were added to the sample solution in order to precipitate the polymer. The precipitated polymer and the solution containing the color body were then separated by filtration. The properties of the precipitated polymer are contained in the table below. Comparing the precipitated polymers' properties to the starting polymers' properties, one can see that the color of the polymers are significantly enhanced.

| | Polymer | Solution color of terpolymer: | | | |
|---|---|---|---|---|---|
| | [sorbitol] | after precipitation | | | |
| Run | (wt %) | L | a | b | YI |
| 1 | N.D. | 99.7 | 0 | 0.1 | 0.3 |
| 2 | 0.1 | 99.6 | 0 | 0.2 | 0.3 |
| 3 | 0.1 | 100 | 0 | 0 | 0 |

The invention claimed is:

1. A method of producing an isosorbide-containing polycarbonate comprising the steps of:
   (i) providing a first monomer component comprising isosorbide,
   (ii) performing a monomer component conditioning step selected from the group consisting of: (a) testing the first monomer component for the presence of sorbitol, and if sorbitol is present, treating the first monomer component to reduce the level of sorbitol to an amount less than 0.10 mole % in the first monomer component, and (b) treating the first monomer component to reduce the level of sorbitol to an amount less than 0.10 mole % in the first monomer component,
   (iii) forming a reaction mixture by adding a diaryl carbonate and a catalyst to the first monomer component, and
   (iv) allowing the reaction mixture to react under polymerization conditions to build molecular weight, thereby producing an isosorbide-containing polycarbonate.

2. The method of claim 1, wherein the method further comprises the step of adding one or more additional monomer components to the first monomer component selected from the group consisting of: BPA, $C_{36}$ branched fatty diol, $C_{36}$ diacid, dodecanedioic acid, and sebacic acid.

3. The method of claim 2, wherein the one or more additional monomer components comprise BPA and $C_{36}$ diacid.

4. The method of claim 1, wherein the method is accomplished by performing step (iii) before or after (ii).

5. The method of claim 1, wherein the monomer component conditioning step (ii) is performed to reduce the level of sorbitol to an amount less than 0.05 mole % in the first monomer component.

6. The method of claim 5, wherein the monomer component conditioning step (ii) is performed to reduce the level of sorbitol to an amount less than 0.01 mole % in the first monomer component.

7. The method of claim 1, wherein in step (iv) the reaction mixture reacts under melt polymerization conditions to prepare polycarbonate, the catalyst is a melt transesterification catalyst, and the diaryl carbonate comprises an ester-substituted diaryl carbonate.

8. The method of claim 1, further comprising the step of:
   (v) performing a polycarbonate treatment step selected from the group consisting of: (a) testing the polycarbonate for the presence of a sorbitol-derived color body associated with a NMR peak located over a chemical shift at about 2.55 ppm in a $^1$H-NMR spectrum, and if the sorbitol-derived color body is present, treating the polycarbonate prepared in step (i) to reduce the level of the sorbitol-derived color body, and (b) treating the polycarbonate to reduce the level of the sorbitol-derived color body.

9. A method of producing an isosorbide-containing polycarbonate, comprising the steps of:
   (i) preparing a polycarbonate by reacting isosorbide with a diaryl carbonate in the presence of a polymerization catalyst under polymerization conditions, and
   (ii) performing a polycarbonate treatment step selected from the group consisting of: (a) testing the polycarbonate prepared in step (i) for the presence of a sorbitol-derived color body associated with a $^1$H-NMR peak located at a chemical shift of about 2.55 ppm in a $^1$H-NMR spectrum, and if the sorbitol-derived color body is present, treating the polycarbonate prepared in step (i) to reduce the level of the sorbitol-derived color body, and (b) treating the polycarbonate prepared in step (i) to reduce the level of the sorbitol-derived color body, thereby producing an isosorbide-containing polycarbonate product.

10. The method of claim 9, wherein in step (ii) the polycarbonate prepared in step (i) is tested for the presence of the sorbitol-derived color body using $^1$H-NMR analysis, UV vis spectra analysis, X-Rite analysis, or by visually comparing the polycarbonate produced in step (i) with known color standards for polycarbonate.

11. The method of claim 9, wherein in step (ii) the polycarbonate prepared in step (i) is treated to reduce the presence of the sorbitol-derived color body by dissolving the polycarbonate in a solvent and precipitating the polycarbonate from solution.

12. The method of claim 11, wherein the solvent is a chlorinated solvent selected from the group consisting of chloroform and dichloromethane.

13. The method of claim 9, wherein step (ii) is performed to reduce the concentration of the sorbitol-derived color body in the polycarbonate produced in step (i) such the polycarbonate product has less than 50% of the area contained under the $^1$H-NMR peak located at a chemical shift of about 2.55 ppm in a $^1$H-NMR spectrum of the product polycarbonate than does the polycarbonate produced in step (i).

14. The method of claim 9, wherein step (ii) is performed to reduce the concentration of the sorbitol-derived color body in the polycarbonate produced in step (i) such the polycarbonate product has less than 25% of the area contained under the $^1$H-NMR peak spanning a chemical shift of about 2.55 ppm in a $^1$H-NMR spectrum of the product polycarbonate than does the polycarbonate produced in step (i).

15. The method of claim 9, wherein step (ii) is performed to decrease the YI of the polycarbonate as measured using UV Vis spectrometry by a value of 2 or more.

16. The method of claim 9, wherein step (i) is performed by reacting the isosorbide with a diaryl carbonate in the presence of one or more additional monomer components selected from the group consisting of: BPA, $C_{36}$ branched fatty diol, $C_{36}$ diacid, dodecanedioic acid, and sebacic acid.

17. The method of claim 16, wherein the one or more additional monomer components comprise BPA and $C_{36}$ diacid.

18. The method of claim 10, wherein in step (i) the reaction mixture reacts under melt polymerization conditions to prepare polycarbonate, wherein the catalyst is a melt polymerization catalyst and the diaryl carbonate comprises and activated diaryl carbonate.

19. A polycarbonate comprising repeat units derived from isosorbide, and a residue derived from an activated diaryl carbonate, wherein the polycarbonate has $^1$H-NMR peaks associated with the repeat units derived from isosorbide and wherein the polycarbonate contains no more than a maximum allowable amount of sorbitol-derived color bodies, wherein if sorbitol-derived color bodies are present in the polycarbonate, the polycarbonate has a $^1$H-NMR peak associated with the sorbitol-derived color bodies, and wherein the maximum allowable amount of sorbitol-derived color bodies are present when the integrated area of the $^1$H-NMR peak associated with the sorbitol-derived color bodies divided by the total combined integrated areas of the $^1$H-NMR peaks associated with the repeat units derived from isosorbide is 0.025.

20. The method of claim 19, wherein the polycarbonate contains sorbitol-derived color bodies and wherein the integrated area of the $^1$H-NMR peak associated with the sorbitol-derived color bodies divided by the total combined integrated areas of the $^1$H-NMR peaks associated with the repeat units derived from isosorbide is less than 0.01.

21. The polycarbonate of claim 19, wherein the polycarbonate contains no detectable amount of sorbitol-derived color bodies.

22. The polycarbonate of claim 19, wherein the residue derived from an activated diaryl carbonate is derived from an ester-substituted diaryl carbonate and the residue comprises methyl salicylate.

* * * * *

UNITED STATES PATENT AND TRADEMARK OFFICE
CERTIFICATE OF CORRECTION

| | | |
|---|---|---|
| PATENT NO. | : 7,863,404 B2 | |
| APPLICATION NO. | : 12/238683 | |
| DATED | : January 4, 2011 | |
| INVENTOR(S) | : Brack et al. | |

It is certified that error appears in the above-identified patent and that said Letters Patent is hereby corrected as shown below:

Column 28, Lines 4 - 8, Claim 18 should read as follows: --The method of claim 10, wherein in step (i) the reaction mixture reacts under melt polymerization conditions to prepare polycarbonate, wherein the catalyst is a melt polymerization catalyst and the diaryl carbonate comprises an activated diaryl carbonate.--

Column 28, Line 25, Claim 20 should read as follows: --The polycarbonate of claim 19, wherein the polycarbonate--

Signed and Sealed this
Fifteenth Day of March, 2011

David J. Kappos
*Director of the United States Patent and Trademark Office*